(12) United States Patent
Masuda et al.

(10) Patent No.: US 7,907,499 B2
(45) Date of Patent: Mar. 15, 2011

(54) OPTICAL ELEMENT, OPTICAL ELEMENT MANUFACTURING METHOD AND OPTICAL PICKUP DEVICE

(75) Inventors: Osamu Masuda, Machida (JP); Masahiro Morikawa, Hachioji (JP); Hiroshi Miyakoshi, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 193 days.

(21) Appl. No.: 12/309,495

(22) PCT Filed: Jul. 9, 2007

(86) PCT No.: PCT/JP2007/063657
§ 371 (c)(1),
(2), (4) Date: Jan. 21, 2009

(87) PCT Pub. No.: WO2008/013047
PCT Pub. Date: Jan. 31, 2008

(65) Prior Publication Data
US 2010/0002299 A1    Jan. 7, 2010

(30) Foreign Application Priority Data

Jul. 26, 2006  (JP) ................................ 2006-203408

(51) Int. Cl.
*G11B 7/135*     (2006.01)
(52) U.S. Cl. .................................. 369/112.18
(58) Field of Classification Search .......... None
See application file for complete search history.

(56) References Cited

U.S. PATENT DOCUMENTS

| | | | | | |
|---|---|---|---|---|---|
| 4,654,839 | A | * | 3/1987 | Endo | 369/44.24 |
| 5,687,153 | A | * | 11/1997 | Komma et al. | 369/112.12 |
| 5,825,555 | A | * | 10/1998 | Oono et al. | 359/668 |
| 6,201,780 | B1 | * | 3/2001 | Katayama | 369/112.19 |
| 6,240,053 | B1 | * | 5/2001 | Akiyama | 369/44.23 |
| 6,272,099 | B1 | * | 8/2001 | Mizuno et al. | 369/112.26 |
| 7,145,710 | B2 | * | 12/2006 | Holmes | 359/279 |

(Continued)

FOREIGN PATENT DOCUMENTS

| | | |
|---|---|---|
| JP | 61-155801 | 9/1986 |
| JP | 62-212940 A | 9/1987 |
| JP | 2005-114704 A | 4/2005 |

(Continued)

OTHER PUBLICATIONS

S. Kawakami, "At the front of practical application of photonic crystal", o plus E, vol. 28, No. 4, pp. 381-385 (Apr. 2006).

*Primary Examiner* — Peter Vincent Agustin
(74) *Attorney, Agent, or Firm* — Holtz, Holtz, Goodman & Chick, PC

(57) ABSTRACT

An optical element includes: opposing surfaces each including two areas each of which includes a fine-periodic structure. The fine-periodic structures of the two areas have different directions from each other in each of the opposing surfaces. One of the opposing surfaces with the fine-periodic structures works as a quarter-wave plate and the other of the opposing surfaces with the fine-periodic structures works as a polarization separating element. A boundary of the two areas in one of the opposing surfaces and a boundary of the two areas in the other of the opposing surfaces are positionally identical.

3 Claims, 13 Drawing Sheets

U.S. PATENT DOCUMENTS

| | | | |
|---|---|---|---|
| 7,170,661 B2 * | 1/2007 | Ogasawara et al. | 359/22 |
| 7,236,442 B2 * | 6/2007 | Sugiki et al. | 369/103 |
| 2004/0085660 A1 * | 5/2004 | Hara | 359/883 |
| 2007/0159932 A1 * | 7/2007 | Takeshita et al. | 369/13.28 |
| 2010/0002299 A1 * | 1/2010 | Masuda et al. | 359/495 |

FOREIGN PATENT DOCUMENTS

| | | |
|---|---|---|
| JP | 2005-352378 A | 12/2005 |
| JP | 2006-252716 A | 9/2006 |
| JP | 2006-323926 A | 11/2006 |
| JP | 2007-183303 A | 7/2007 |

* cited by examiner

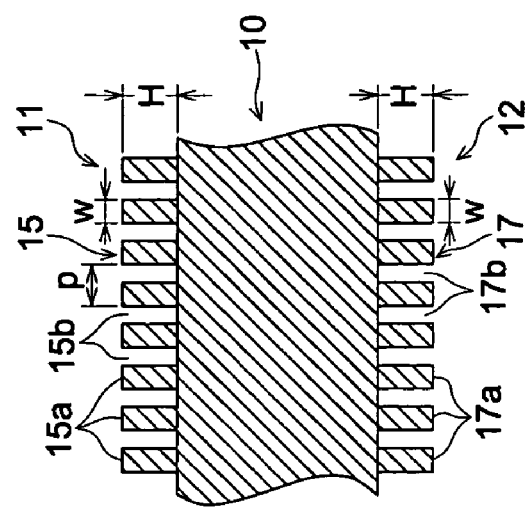
FIG. 1(a)
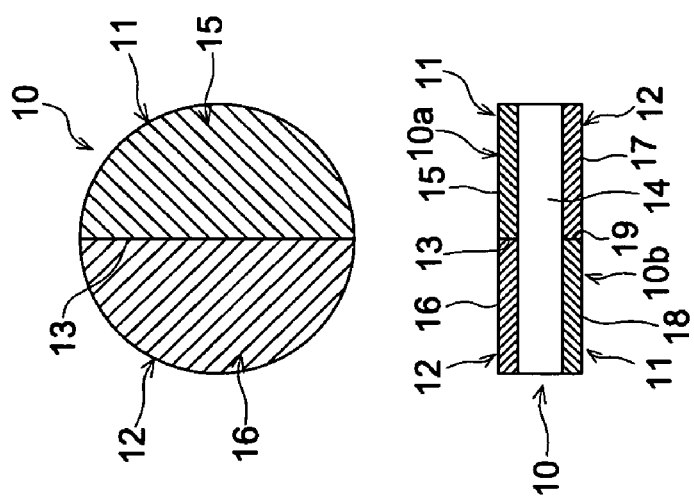
FIG. 1(b)
FIG. 1(c)
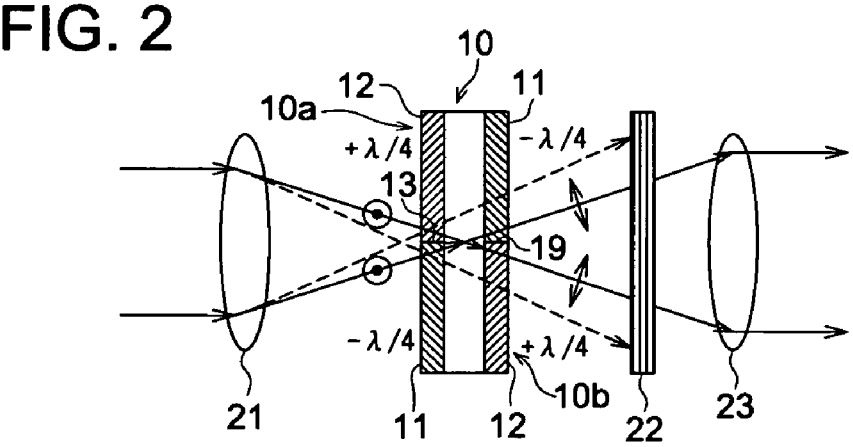
FIG. 2

OPTICAL ELEMENT, OPTICAL ELEMENT MANUFACTURING METHOD AND OPTICAL PICKUP DEVICE

This application is the United States national phase application of International Application PCT/JP2007/063657 filed Jul. 9, 2007.

TECHNICAL FIELD

The present invention-relates to an optical element including fine-periodic structures which function as a quarter-wave plate and a polarization separating element, to a manufacturing method for the optical element, and to an optical pickup device including therein the optical element.

BACKGROUND ART

Patent Document 1 (Unexamined Japanese Patent Application Publication No. 2005-352378) discloses an area division type wave plate. The area division type wave plate is a wave plate that changes the state of polarization of light, in which dielectric flat plates are arranged with a microscopic period to form a fine-periodic structure. In one base member of the wave plate, there are two or more areas which differ from each other in at least one of a thickness of the dielectric flat plates, a height of the dielectric flat plates, and a period of the arranged dielectric flat plates. Further, in the areas, two or more areas differ from each other in a direction of an optical axis.

Further, Non-patent Document 1 (Sholiro Kawakami, "At the front of practical application of photonic crystal", O plus E Vol. 28, No. 4, April 2006) discloses wave plates for reading information from a multi-layer optical disc, as an application of the area division type wave plate employing a three-dimensional periodic structure (photonic crystal). Each of the wave plates 99 and 100 includes periodic structures shown in FIG. 15(*a*) and is equipped with areas 101 and 102 divided by parting line (boundary) 103. These wave plates 99 and 100 are arranged in an optical system for optical pickup shown in FIG. 15(*b*). Namely, two wave plates 99 and 100 each having divided areas 101 and 102 are arranged as shown in FIG. 15(*b*) to change polarization by 90° between a light beam (solid line) that focuses at the point between the wave plate 99 and wave plate 100 and a light beam (broken line) that focuses at the point on the outside of the wave plate 99 and wave plate 100. Thereby, the light beams are separated by polarizing plate 104. Since the polarizing plate 104 transmits the light beam shown with a solid line, it transmits only reflected light coming from a position at a certain depth in the multi-layer optical disc as shown in FIG. 15(*b*).

DISCLOSURE OF INVENTION

Problems to be Solved by the Present Invention

However, the area division type wave plate explained above requires accuracy for space k between two wave plates 99 and 100, for relative positioning of boundaries 103 of divided areas between wave plates 99 and 100, and for the boundaries 103 themselves. When the area division type wave plate is used for an optical pickup device, the aforesaid accuracy has a great influence on detection ability. Therefore, alignment of two wave plates 99 and 100 becomes to be complicated and time-consuming, resulting in an increase of a man hour for assembly.

In view of the above problems in the conventional arts, an object of the present invention is to provide an optical element having fine-periodic structures wherein high accuracy has been realized for the space between wave plates, for the relative positioning of boundaries of divided areas between the wave plates, and for the boundaries themselves of divided areas, and a manufacturing method for the optical element. Another object of the present invention is to provide an optical pickup device wherein cost can be reduced by substantial reduction of a man hour that is consumed in incorporating the optical element in the optical system.

Means to Solve the Problems

To attain the aforesaid objects, the optical element relating to the present invention is an optical element with fine-periodic structures. The optical element comprises opposing surfaces each comprising two areas each including a fine-periodic structure. The fine-periodic structures of the two areas have different directions from each other in each of the opposing surfaces. One of the opposing surfaces with the fine-periodic structures works as a quarter-wave plate and the other of the opposing surfaces with the fine-periodic structures works as a polarization separating element. A boundary of the two areas in one of the opposing surfaces and a boundary of the two areas in the other of the opposing surfaces are identical.

This optical element realizes the followings: (1) This optical element provides a boundary of divided areas with high accuracy, because polarizing function is added by fine-periodic structures that is suitable for making their boundary width smaller; (2) The opposing surfaces include fine-periodic structures and only one optical element can be employed without arranging optical elements such as two wave plates in an optical system as conventional applications. Therefore, it does not require space adjustment of the optical elements and realizes to arrange a surface working as a quarter-wave plate and a surface working as a polarization separating element with a highly accurate interval; (3) There is a boundary of two areas where directions of fine-periodic structures are different from each other, in each of the opposing surfaces. The boundaries are positioned at the substantially same position on the opposing surfaces. Therefore, it does not require relative positioning between a boundary of divided areas on one of polarization elements and a boundary of divided areas on the other of polarization elements. Therefore, it is possible to provide an optical element wherein a relative position between the boundaries of divided areas is adjusted accurately; and (4) Since an alignment of a surface working as a quarter-wave plate and a surface working as a polarization separating element is realized with high accuracy and good stability, a man hour for incorporating the optical element into an optical system by combining with other optical parts can be reduced greatly.

Further, it is preferable that, in the two areas formed on the one of the opposing surfaces working as a quarter-wave plate, the fine-periodic structure in one of the two areas works as a –quarter-wave plate and the fine-periodic structure in the other of the two areas works as a +quarter-wave plate.

A manufacturing method for an optical element relating to the present invention is a manufacturing method of an optical element comprising opposing surfaces each comprising two areas each including a fine-periodic structure. The fine-periodic structures of the two areas have different directions from each other in each of the opposing surfaces. The method comprises: arranging a pair of molds to face each other, where the pair of molds comprises fine-periodic structures corresponding to the above fine-periodic structures; arranging a base member between the pair of molds; and pressing the base member arranged between the pair of molds to transfer the fine-periodic structures of the molds to the opposing surfaces of the optical element.

This method of manufacturing an optical element allows a simple manufacture, through an imprint method, of an optical element comprising opposing surfaces each comprising two areas each including a fine-periodic structure, wherein the fine-periodic structures of the two areas have different directions from each other in each of the surfaces. Further, it is possible to form fine-periodic structures on opposing surfaces of the base member by using a pair of molds such as an upper mold and a lower mold which are aligned accurately in advance. Therefore, it is possible to obtain an optical element which does not need adjustment between the opposing surfaces in terms of a position of the boundaries of two areas and their interval. In this way, it is possible to manufacture an optical element that exhibits aforesaid actions and effects of (1)-(4).

In the aforesaid manufacturing method of an optical element, it is possible to align a pair of molds accurately, by adjusting a relative position between the pair of molds so that boundaries of the pair of molds are positionally identical, wherein the boundaries of the pair of molds correspond to the boundaries of the two areas.

Incidentally, for this alignment of molds, it is possible to attach a monitor device capable of observing a flat surface of a mold on an imprint forming apparatus, and thereby to adjust a relative position of a pair of molds so that boundary positions of the paired molds may agree practically with observing a boundary positions of the molds corresponding to the boundaries of the two areas of the optical element. It is further possible to adjust the relative position of the pair of molds until boundaries of two areas agree practically on the opposing surfaces of an optical element, by conducting preliminary imprint forming.

Further, it is preferable to heat the molds before pressing the base member. It is also preferable that the base member comprises a thermoplastic resin, which makes it possible to form fine-periodic structures by conducting convex-concave deformation on opposing surfaces of the base member.

Further, by forming the molds to transmit an ultra-violet ray, arranging an ultraviolet curing resin between the base member and each of the molds, and emitting a ultra-violet ray to the ultraviolet curing resin through the molds with the molds pressing the base member, fine-periodic structures on the molds can be transferred onto the ultraviolet curing resin on the base member. In this case, fine-periodic structures can be formed with ultraviolet curing resin on each of opposing surfaces of the base member. In the meantime, the base member can be constituted with glass material.

It is further possible to form a fine-periodic structure on a metal layer by providing a surface including a metal layer on the base member, and etching the metal layer after the fine-periodic structures of the molds are transferred on the metal layer. It is possible to manufacture an optical element wherein, for example, one of the opposing surfaces with the fine-periodic structures works as a quarter-wave plate and the other of the opposing surfaces with the fine-periodic structures works as a polarization separating element.

An optical pickup device relating to the invention is an optical pickup device comprising: a light source for emitting a light flux with a predetermined wavelength; an objective lens for converging the light flux into a light spot on a recording surface of a recording medium; a light-receiving element for receiving a reflected light flux from the recoding surface of the recording medium; a beam splitter arranged to guide the light flux from the light source to the objective lens and to guide the reflected light flux from the recording surface of the recording medium to the light-receiving element; and an optical element described above, arranged between the beam splitter and the light-receiving element. A surface of the optical element working as the polarizing splitting element faces the light-receiving element.

In this optical pickup device, when reproducing or recording information for an optical disc having plural recording layers on a surface on one side, only reflected light coming from the recording layer on which a light spot is formed can arrive at the light receiving element, thus, information on the recording layer can be received more accurately. Further, a man hour consumed for incorporating the aforesaid optical element can be reduced sharply, resulting in cost reduction.

EFFECTS OF THE INVENTION

The optical element relating to the present invention can accurately provides a space between a surface that works as a quarter-wave plate and a surface that works as a polarization splitting element, and relative positioning of the boundary of divided areas between the opposing surfaces. The optical element further can reduce the cost because a man hour consumed for incorporating the optical element in the optical system is reduced sharply.

BRIEF DESCRIPTION OF DRAWINGS

FIG. 1(a) is a schematic plan view of an optical element relating to the first embodiment, FIG. 1(b) is a schematic sectional view of the optical element and FIG. 1(c) is an enlarged schematic and local sectional view of the optical element.

FIG. 2 is a diagram schematically showing an optical system of the second embodiment wherein optical element 10 in FIGS. 1(a)-1(c) is arranged.

Figure 12:
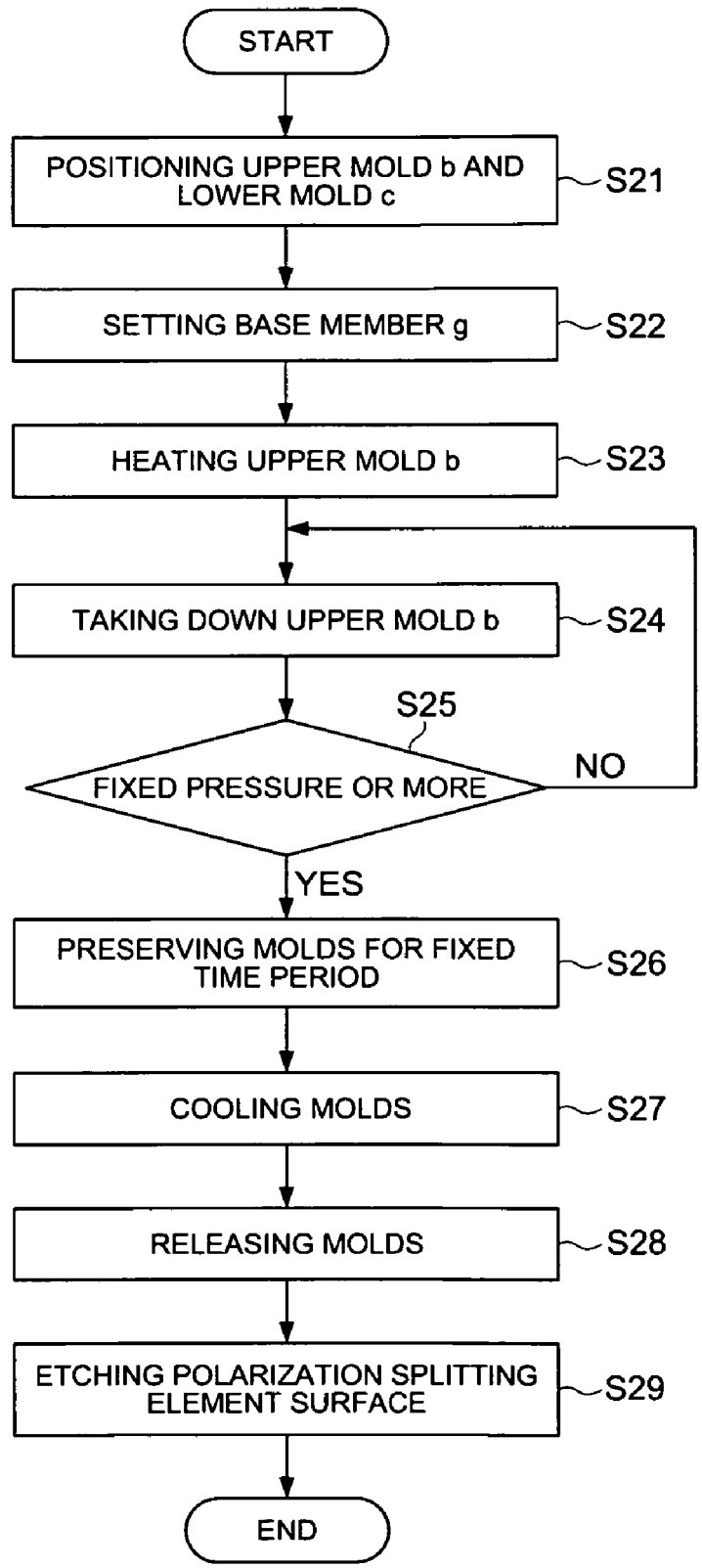
FIG. 12 is a flow chart for illustrating steps S21-S29 of a manufacturing method by an imprint method in the fifth embodiment.
Figure 13:
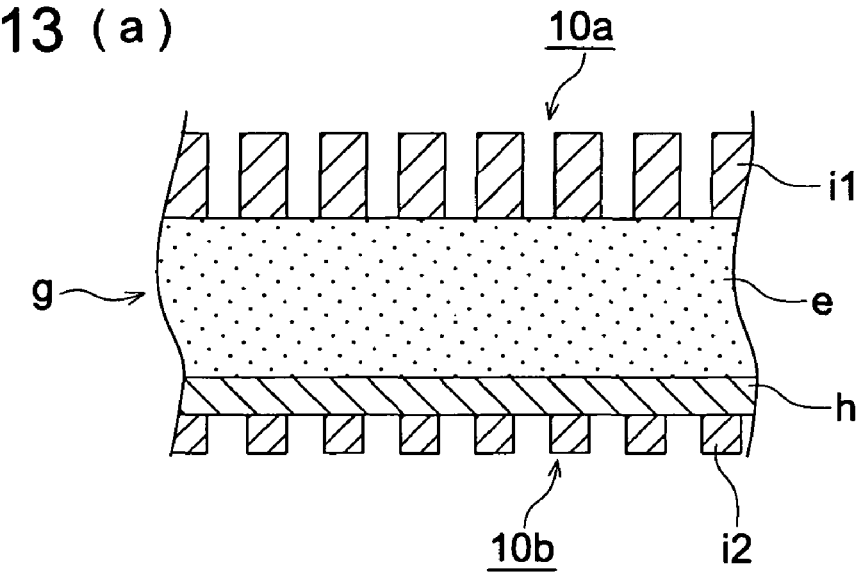
Figure 13:
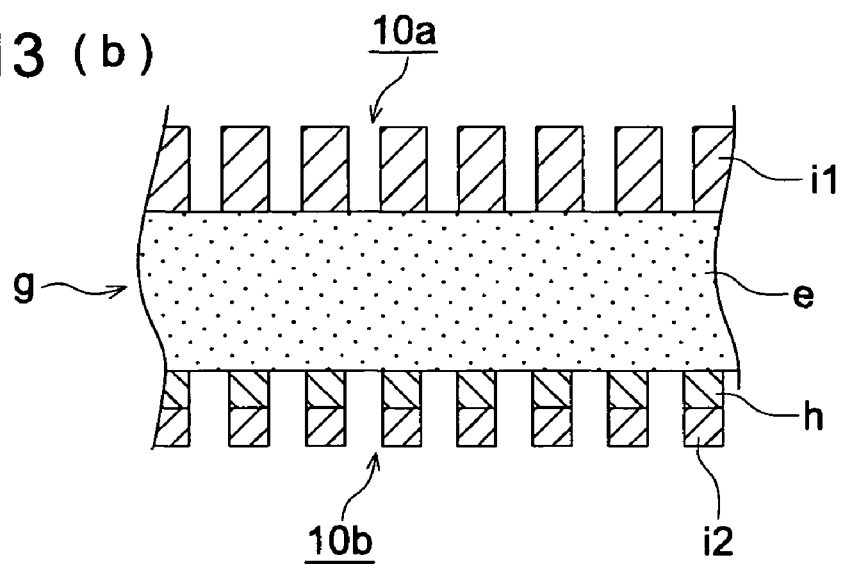
Figure 13:
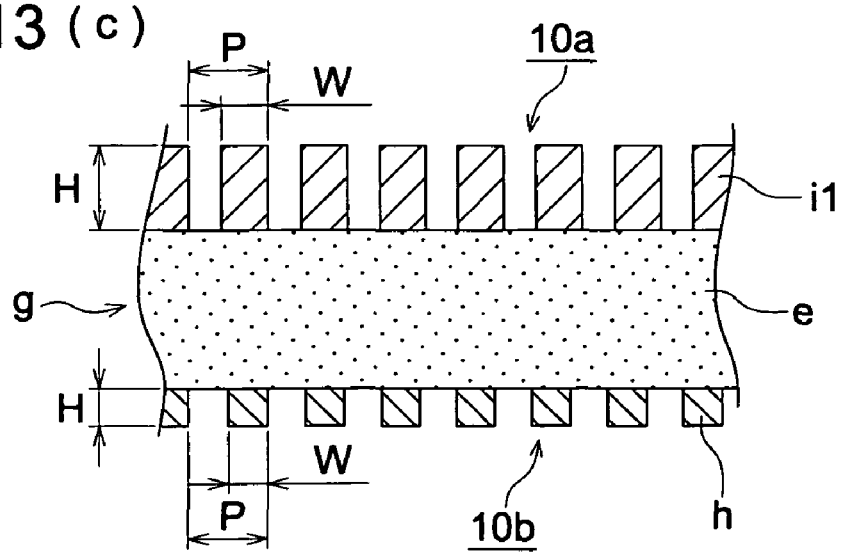

Each of FIGS. 13(a)-13(c) is a schematic diagram showing the state of a section of an object to be formed in the process shown in FIG. 12.

Figure 3:
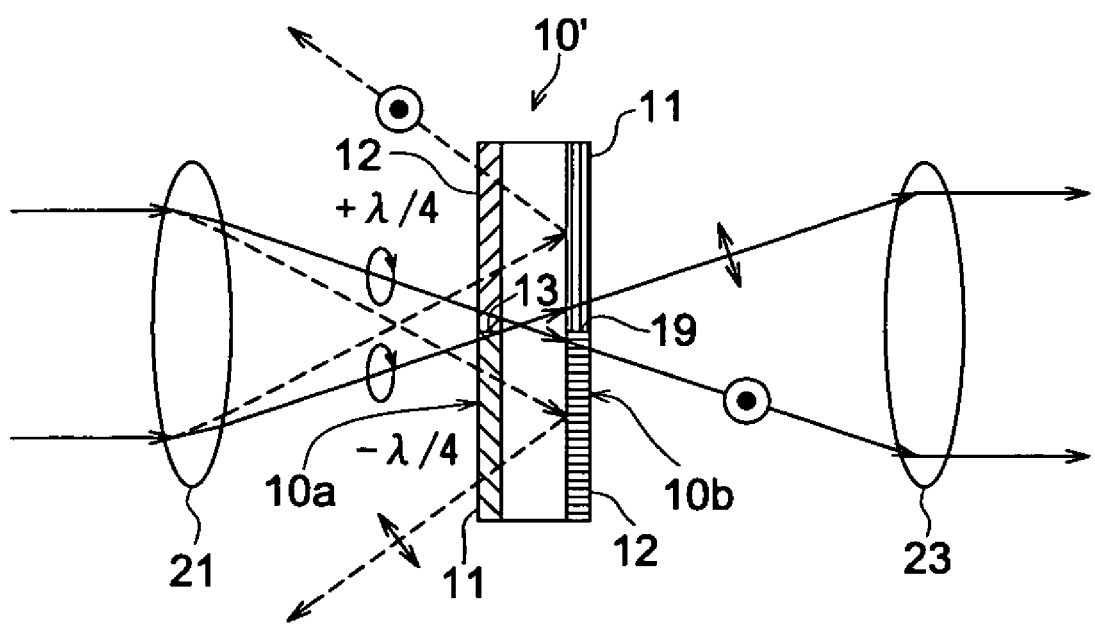
FIG. 3 is a diagram schematically showing another optical system of the second embodiment.
Figure 14:
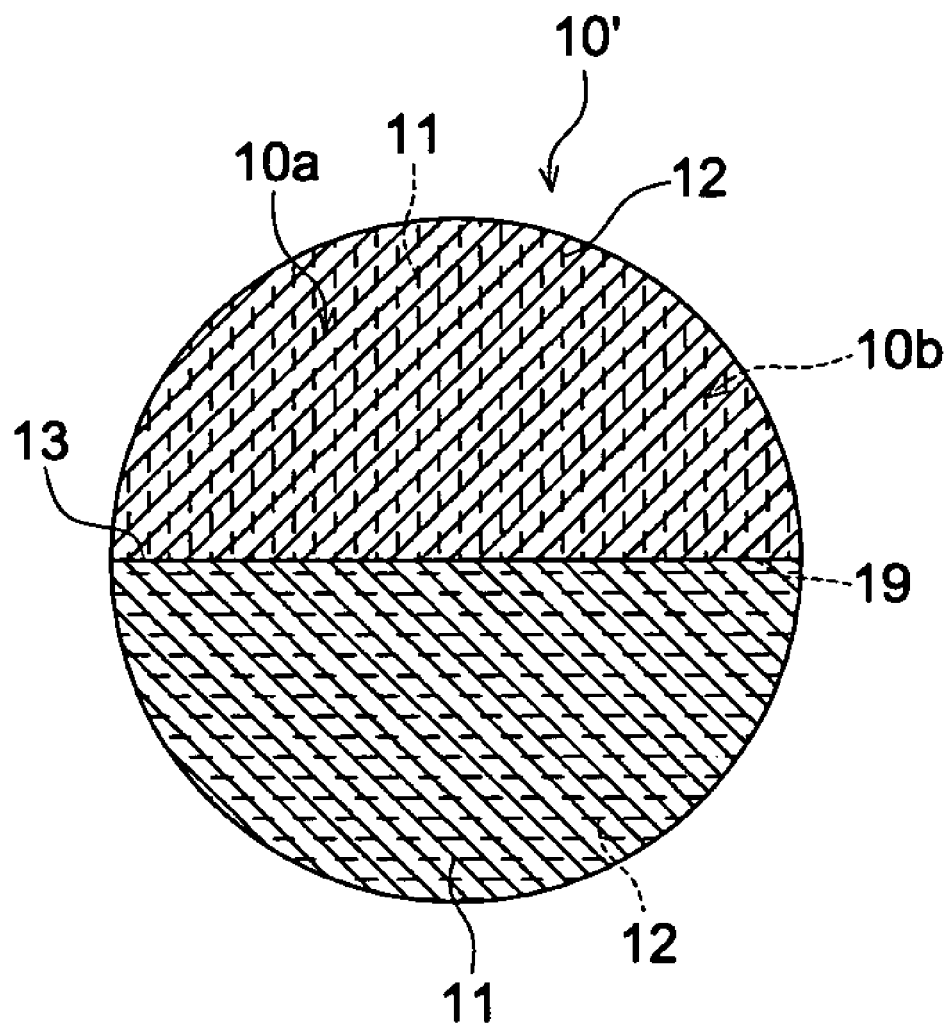

FIG. 14 is a schematic plan view in which optical element 10' of an optical system shown in FIG. 3 is viewed from the lens 21 side.

Figure 15:
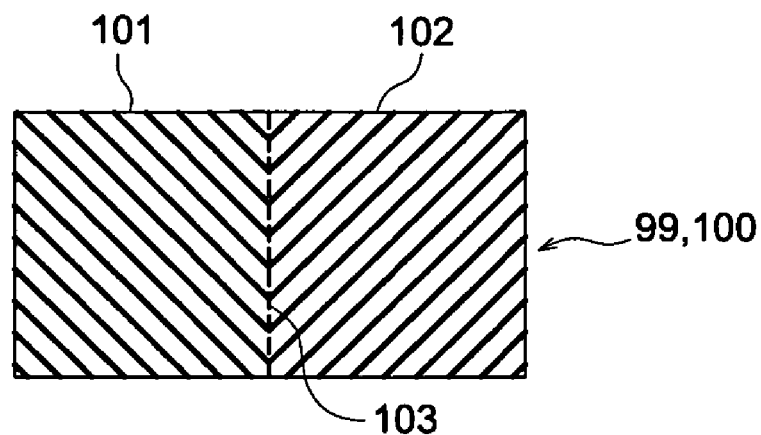
Figure 15:
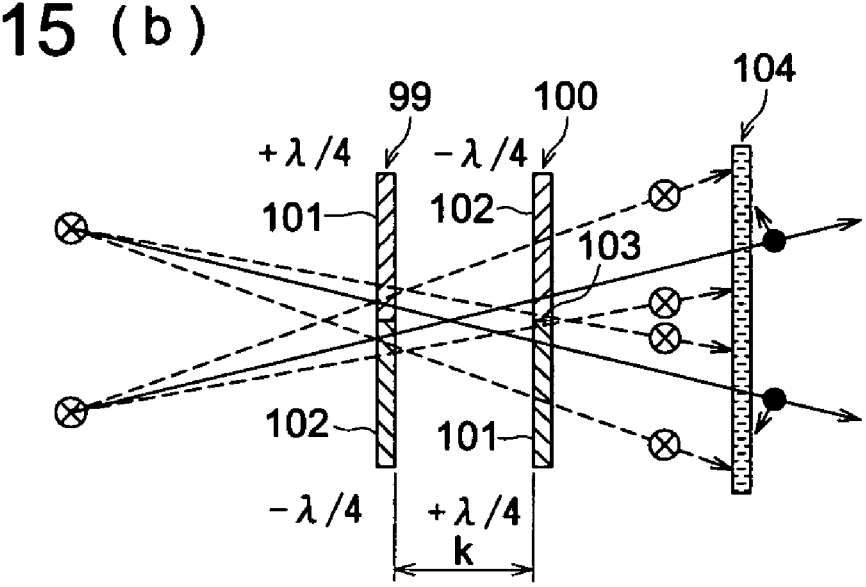

FIG. 15(a) is a plan view of a surrounding portion of a boundary of a conventional area division type wave plate, and FIG. 15(b) is a diagram showing an optical system employing a conventional area division type polarizing element.

EXPLANATION OF NOTATION

| EXPLANATION OF NOTATION | |
|---|---|
| 10, 10' | Optical element |
| 10a | Surface on one side |
| 10b | Surface on the other side |
| 11 | First area |
| 12 | Second area |
| 13, 19 | Boundary section (Boundary) |
| 14 | Base member |
| 15, 16 | Fine-periodic structure section (Fine-periodic structure) |
| 17, 18 | Fine-periodic structure section (Fine-periodic structure) |
| 21, 23 | Lens |
| 22 | Polarizing plate |
| 30 | Imprint device |
| 37 | Mounting hole |
| 38, 39 | Mounting section |
| 40 | Multi-layer optical disc |
| 40a | Recording layer |
| a, d, g | Base member |
| b | Upper mold |
| c | Lower mold |
| e | Glass plate |
| f | Ultraviolet curing resin layer |
| h | Metal layer |
| i1 | Thermoplastic resin layer |
| i2 | Thermoplastic resin layer |

BEST MODE FOR CARRYING OUT THE INVENTION

The best mode for carrying out the invention will be explained as follows, referring to the drawings.

First Embodiment

FIG. 1(a) is a schematic plan view of an optical element relating to the first embodiment, FIG. 1(b) is its schematic sectional view, and FIG. 1(c) is an enlarged schematic and local sectional view.

As is shown in the plan view of FIG. 1(a), disc-shaped optical element 10 is equipped with first area 11 having fine-periodic structure 15 that extends linearly and with second area 12 having fine-periodic structure 16 extending in the direction that is different from the first area so that linear boundary section 13 may be interposed between the first area 11 and the second area 12. Both the fine-periodic structure 15 and the fine-periodic structure 16 are formed so that they cross at the boundary section 13 between the first area and the second area 12.

With respect to the optical element 10, the first area 11 and the second area 12 are formed on each of opposing surfaces 10a and 10b of base member 14. Namely, the fine-periodic structures are formed on opposing surfaces 10a and 10b as shown in FIG. 1(b), such that the second area 12 is located on the rear portion of the first area 11, and the first area 11 is located on the rear portion of the second area 12.

As shown in FIG. 1(b) and FIG. 1(c), first area 11 of surface 10a on one surface of the optical element 10 has convex-concave shaped fine-periodic structure section 15 in which convex sections 15a and concave sections 15b are formed periodically and repeatedly. The second area 12 of surface 10a on one surface has convex-concave shaped fine-periodic structure 16, and convex sections and concave sections are formed periodically and repeatedly.

In the same way, second area 12 of surface 10b on the other side has convex-concave shaped fine-periodic structure 17 in which convex section 17a and concave section 17b are formed periodically and repeatedly. The first area 11 of surface 10b on the other side has convex-concave shaped fine-periodic structure 18.

With respect to optical element 10, the surface 10a on one side is divided into the first area 11 and the second area 12 with boundary section 13 as shown in FIG. 1(a) and FIG. 1(b), and the surface 10b on the other side is similarly divided into the first area 11 and the second area 12 with boundary section 19. Boundary section 13 on surface 10a on one side and boundary section 19 on surface 10b on the other side almost are identical at nearly the same positions as shown in FIG. 1(b). Namely, boundary section 13 on surface 10a and boundary section 19 on surface 10b are in a relationship of projected position wherein when linear boundary section 13 on surface 10a on one side is projected in the direction perpendicular to its surface (direction perpendicular to the sheet of FIG. 1(a)), it is mostly overlapped with linear boundary section 19 on surface 10b on the other side.

In the optical element 10 shown in FIGS. 1(a)-1(c), when fine-periodic structures 15-18 on both surfaces 10a and 10b are formed by resin to provide the convex-concave shape with, for example, periodic pitch p of about 300 nm, with width w of each convex portion of about 200 nm, and with depth H of about 1000 nm, the fine-periodic structure can be constituted to work as a structural birefringence wave element (see optical element 10 in FIG. 2). That is, the first area 11 on each of opposing surfaces works as a −quarter wave plate and the second area 12 on each of opposing surfaces works as a +quarter wave plate. The +quarter wave plate gives light a phase difference of +90°, and the −quarter wave plate gives light a phase difference of −90°. These quarter plates convert circular polarization into linear polarization (or vice versa), but obtained polarization directions differs from each other in the quarter plates. Incidentally, the aforesaid dimensions represent an example, and other dimensions are naturally accepted.

Alternatively, it is possible that fine-periodic structures 15 and 16 on surface 10a on one side are formed by resin to provide the convex-concave shape with, for example, periodic pitch p of about 300 nm, with width w of each convex portion of about 200 nm, and with depth H of about 1000 nm to provide a function of a −quarter wave plate and a +quarter wave plate, and that fine-periodic structures 17 and 18 on surface 10b on the other side are formed by metal such as Aluminum to provide the convex-concave shape with, for example, periodic pitch p of about 150 nm, with width w of each convex portion of about 100 nm, and with depth H of about 150 nm to provide a function of a polarization splitting element (see optical element 10' in FIG. 3). The aforesaid dimensions represent an example, and other dimensions are naturally accepted.

Following actions and effects are exhibited by the optical element 10 and the optical element 10' explained above.

(1) The formed fine-periodic structures provide polarization functions such as a quarter wave plate and a polarization splitting plate, and these fine-periodic structures can reduce the widths of boundary sections 13 and 19 between areas 11 and 12. Therefore, the boundary sections themselves of divided areas can be formed in highly accuracy.

(2) Owing to the fine-periodic structures provided on opposing surfaces, it has only to arrange a single optical element without arranging two elements having polarization functions such as wave plates in an optical system as in the past. Thus, space adjustment between the two elements turns out to be unnecessary, and high accuracy of a space can be realized.

(3) A boundary of two areas 11 and 12 in which directions of fine-periodic structures are different from each other, is arranged on each of the opposing surfaces so that the positions of the boundaries are substantially identical. Therefore, it does not require providing elements with polarization functions and adjusting relative position between boundaries 13 and 19 each of divided areas 11 and 12 in the elements. Therefore, it is possible to provide an optical element wherein a relational position between the boundaries of divided areas is adjusted accurately.

Second Embodiment

Next, an optical system relating to the second embodiment employing optical element 10 that is shown in FIG. 1 will be explained as follows, referring to FIG. 2. FIG. 2 is a diagram schematically showing an optical system of the second embodiment wherein optical element 10 shown in FIGS. 1(a)-1(c) is arranged.

Optical element 10 shown in FIG. 2 includes fine-periodic structure sections 15-18 formed with resin on opposing surfaces 10a and 10b to work as a structural birefringence wave element. The first areas 11 of surface 10a on one side and surface 10b on the other side work as −quarter wave plate and the second areas 12 of surface 10a on one side and surface 10b on the other side works as +quarter wave plate. As is shown in FIG. 2, optical element 10 is arranged between lens 21 and lens 23, and polarizing plate 22 is arranged between optical element 10 and lens 23.

In the optical system shown in FIG. 2, a light flux (with wavelength λ) with linear polarization shown with a solid line comes from lens 21 and passes through the first areas 11, 11 (−quarter wave plate). The respective first areas provide phase difference −90° and phase difference −90° with the light flux, and the light flux is changed in terms of a direction of polarization. Another light flux passes through the second areas 12, 12 (+quarter wave plate) and the respective second areas provide phase difference +90° and phase difference +90° with the light flux. The light flux is changed in terms of a direction of polarization. The changed light fluxes pass through polarizing plate 22. In this structure, after a light flux coming from lens 21 focuses at the front of surface 10a on one side of optical element 10 as shown with broken lines, the light flux passes through the second area 12 and the first area 11 of the optical element 10 succeedingly, or passes through the first area 11 and the second area 12 succeedingly. The light flux changes in neither the direction of polarization nor the phase difference and the light flux does not pass through polarizing plate 22. In contrast to this, when a light flux coming from lens 21 focuses at a position between surface 10a on one side and surface 10b on the other side of the optical element 10, a phase difference of ±180° is given to the light flux as mentioned above and the direction of polarization is changed. Thus, the light flux passes through polarizing plate 22.

In the optical system shown in FIG. 2, it is possible to provide an optical element 10 which can transmit only a light flux, for example, reflected at a prescribed depth position in a multi-layer optical disc, by arranging optical element 10 so that the light flux coming from lens 21 may focus at a position between surface 10a on one side and surface 10b on the other side of optical element 10, as stated above. If two wave plates were arranged in the optical system shown in FIG. 2, positions of the two wave plates need to be adjusted in the optical axis direction so that light may focus at a position between the two wave plates, and positions of boundaries of divided areas on each of the elements need to be adjusted to be identical each other. These adjustments are complicated, and assembly of the elements is time-consuming. In contrast to this, opposing surfaces of a single optical element 10 are provided with functions of a wave plate, and boundary sections 13 and 19 between two areas 11 and 12 are approximately identical on surface 10a on one side and surface 10b on the other side as shown in FIG. 2. Those make relative positioning between boundary sections 13 and 19 of divided areas 11 and 12 to be unnecessary.

Since it is possible to realize high accuracy and stability of alignment for opposing surfaces of optical element 10 based on the foregoing, a man hour for incorporating the optical element into an optical system with being combined with other optical parts can be reduced drastically.

Next, another optical system of the second embodiment will be explained as follows, referring to FIG. 3 and FIG. 14. FIG. 3 is a diagram schematically showing another optical system of the second embodiment. FIG. 14 is a schematic plan view wherein optical element 10' of the optical system shown in FIG. 3 is viewed from the lens 21 side.

The optical system shown in FIG. 3 has a constitution wherein optical element 10' is arranged between lens 21 and lens 23, and polarizing plate 22 shown in FIG. 2 is omitted.

In the optical element 10' shown in FIG. 3, first area 11 of surface 10a on one side works as −quarter wave plate and second area 12 on one side works as −quarter wave plate, while, first area 11 of surface 10b on the other side works as a first polarization splitting element, and second area 12 on the other side works as a second polarization splitting element.

The coordinate system concerning FIG. 3 is assumed that the perpendicular direction to the sheet of FIG. 3 is represented by +X and the upward direction in the sheet is represented by +Y (which corresponds to the coordinate system having the horizontal axis represented by X and the vertical axis represented by Y in FIG. 14), and +X axis corresponds to 0° and +Y axis corresponds to 90°. By providing optical element 10' such that the fine-periodic structure of second area 12 on surface 10a on one side has the direction of +45° and the fine-periodic structure of first area 11 on one side has the direction of −45° as is shown with solid lines in FIG. 14, and the fine-periodic structure of first area 11 on surface 10b on the other side has the direction of 90° and the fine-periodic structure of second area 12 on the other side has the direction of 0° as is shown with broken lines in FIG. 14, when a light flux enters optical element 10', for example, as a clockwise circularly polarized light, areas 11 and 12 on surface 10b on the other side can exhibit respective functions of the aforesaid first and second polarization separating elements.

Further, when a light flux enters the element as a counter-clockwise circularly polarized light, and when the fine-periodic structures in areas 11 and 12 on surface 10a on one side have directions same as those shown with solid lines in FIG. 14, areas 11 and 12 on surface 10b on the other side can exhibit respective functions of the aforesaid first and second polarization separating elements, by providing fine-periodic structure of the first area 11 on surface 10b on the other side whose direction is 0° and the fine-periodic structure of the second area 12 on the other side whose direction is 90°.

The aforesaid combination is just an example, and any other combinations may also be accepted as far as the following arrangement is provided: fine-periodic structures in the first area 11 and the second area 12 meet at right angles, a direction of the fine-periodic structure in area 11 (alternatively, 12) of surface 10a on one side and a direction of the fine-periodic structure in area 12 (alternatively, 11) of surface 10b on the other side relatively forms an angle of 45°, and a light flux which has passed area 11 of surface 10a on one side passes through area 11 of surface 10b on the other side, and a light flux which has passed area 12 of surface 10a on one side passes through area 12 of surface 10b on the other side.

In the optical system shown in FIG. 3, a light flux (with wavelength %) of a circularly polarized light shown with a solid line coming from lens 21 passes through the first area 11 (−quarter wave plate) on surface 10a on one side of optical element 10' to be converted into a linearly polarized light, and passes through the first polarization splitting element (area 11) on surface 10b on the other side to enter lens 23. Another light flux passes the second area 12 (+quarter wave plate) on surface 10a on one side to be converted into a linearly polarized light (that is different from a light flux which has passed through −quarter wave plate in terms of a polarization direction), and passes through the second polarization splitting element (area 12) on surface 10b on the other side, to enter lens 23.

In this case, when a light flux focuses, for example, at the front side of optical element 10' as shown with broken lines in FIG. 3, the light flux passes through the first area 11 on surface 10a on one side and the light flux is reflected by the second polarization separating element on surface 10b on the other side (area 12). Alternatively, when a light flux passes through the second area 12 on surface 10a on one side, the light flux is also reflected by the first polarization splitting element on surface 10b on the other side (area 12). Thus, the light flux does not pass through optical element 10' as stated above.

On the other hand, when a light flux focuses at the position between surface 10a at one side of optical element 10' and surface 10b at the other side of the optical element 10' as shown with broken lines in FIG. 3, the light flux passes through optical element 10' as stated above.

As stated above, in the optical system shown in FIG. 3, one surface of a single member of optical element 10' has a function as a quarter wave plate, the other surface has a function as a polarization separating element, and boundary sections 13 and 19 each of two areas 11 and 12 are substantially identical on opposing surfaces. Those make relative positioning between boundary sections 13 and 19 of two areas 11 and 12 to be unnecessary. Therefore, high accuracy and stability of alignment between opposing surfaces of optical element 10' can be realized, thus, a man hour for incorporating the optical element into the optical system with combining it with other optical parts can be reduced drastically. Further, in the case of the optical system employing optical element 10' shown in FIG. 3, polarizing plate 22 which has been needed in the optical system shown in FIG. 2 can be omitted, and a reduction of the number of parts can be achieved.

Figure 4:
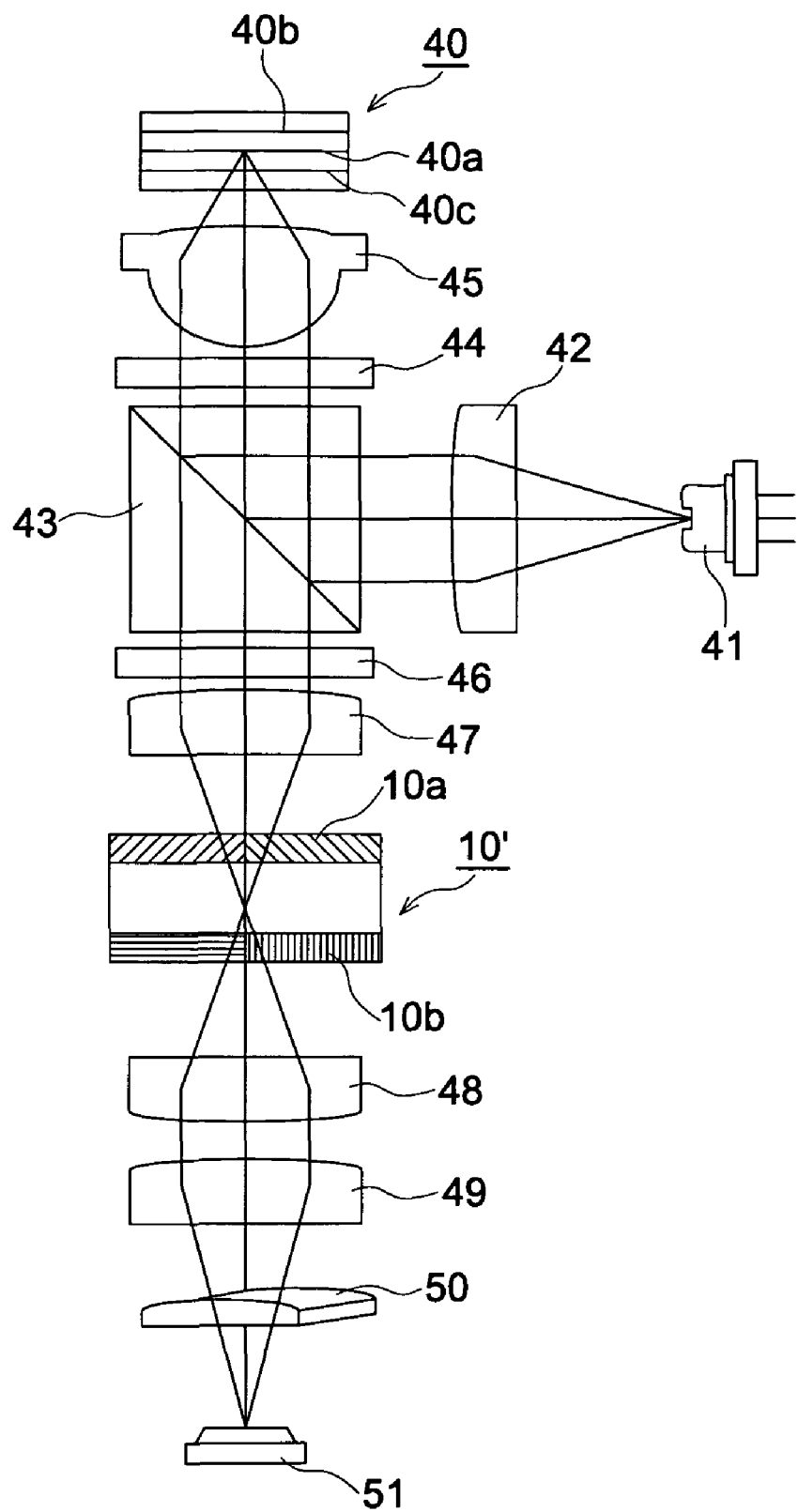
FIG. 4 is a diagram schematically showing an optical system of an optical pickup device employing optical element 10' shown in FIG. 3.

Next, an example that the optical system shown in FIG. 3 is applied to an optical pickup device will be explained as follows, referring to FIG. 4. FIG. 4 is a diagram schematically showing an optical system of an optical pickup device employing optical element 10' shown in FIG. 3.

The optical system of the optical pickup device shown in FIG. 4 shows an embodiment for reading information recorded on recording layer 40a located at a position in the prescribed depth of multi-layer optical disc 40. A laser beam in a shape of a linearly polarized light emitted from laser diode 41 representing a light source is converted to be a collimated light by collimator lens 42 and is converted to be in the state of circular polarization by quarter wave plate 44 after being reflected by polarizing beam splitter 43. The laser beam focuses through objective lens 45 on recording layer 40a at the prescribed depth of multi-layer optical disc 40. A reflected light coming from the recording layer 40a passes through objective lens 45, and is rotated by 90° in terms of the polarization direction by quarter wave plate 44, and passes through polarizing beam splitter 43 to be changed into the state of circular polarization by quarter wave plate 46. After this, the laser beam focuses at a position between surface 10a of optical element 10' and surface 10b through collimator lens 47. The light flux further enters photo-diode 51 representing a light-receiving element, through collimator lens 48, collimator lens 49 and cylindrical lens 50. Owing to this, information recorded on recording layer 40a is converted into electric signals from optical signals so that the electric signals may be read.

In FIG. 4, since a light flux reflected by recording layer 40b located, for example, to be deeper than recording layer 40a of multi-layer optical disc 40 focuses at the front side of surface 10a on one side of optical element 10', the light flux is reflected by the first polarization separating element on surface 10b on the other side of optical element 10' and by the second polarization separating element. Thus, the light flux does not pass through optical element 10' and does not arrive at photo-diode 51, in the same way as in broken lines in FIG. 3. Further, though a light flux reflected from recording layer 40c that is shallower than recording layer 40a of multi-layer optical disc 40 advances in the direction to focus at a position beyond surface 10b on the other side of optical element 10', the light flux is reflected by the first polarization separating element and the second polarization separating element of surface 10b on the other side. The light flux does not pass through optical element 10' and does not arrive at photo-diode 51, in the same way in this case. Namely, in the optical system of the optical pickup device shown in FIG. 4, only reflected light coming from the recording layer on which a spot is formed by objective lens 45, out of plural recording layers of multi-layer optical disc 40, passes through optical element 10' and arrives at photodiode 51.

In the optical system of an optical pickup device shown in FIG. 4, information can be detected with high S/N ratio, and opposing surfaces of optical element 10' can be provided with high accuracy and stability of alignment as stated above. Thereby, a man hour for incorporating optical element 10' into an optical system of an optical pickup device by combining it with other optical parts can be reduced sharply.

Incidentally, in FIG. 4, an explanation was given with an optical system of an optical pickup device that is constituted so that a light flux emitted from laser diode 41 may be reflected by beam splitter 43, and a reflected light coming from a recording layer may pass through beam splitter 43 to be guided to quarter wave plate 46-photo-diode 51, to which, however, the invention is not limited. For example, it is possible to constitute beam splitter 43 so as to transmit a light flux emitted from laser diode 41 and reflect a reflected light from a recording layer, to guide a reflected light from a recording layer to quarter wave plate 46-photodiode 51.

Third Embodiment

Next, a method of manufacturing optical element 10 shown in FIGS. 1(*a*) to 1(*c*) through an imprint method will be explained as the third embodiment as follows, referring to FIGS. 5-8.

Figure 5:
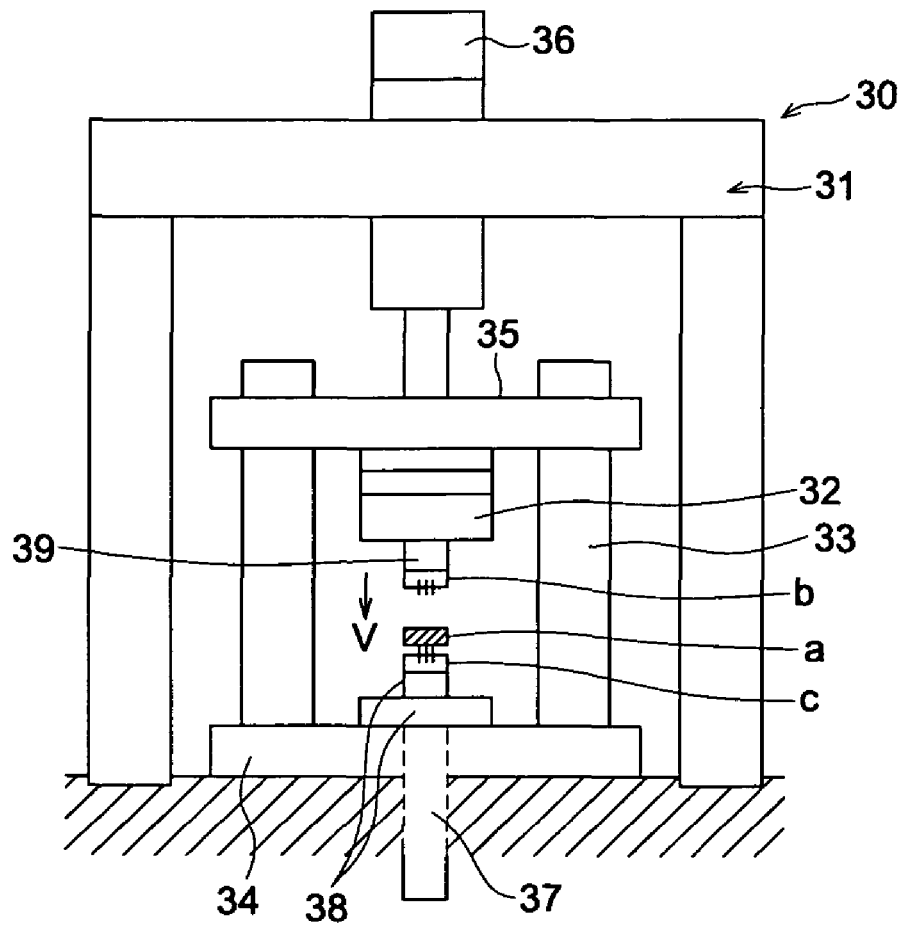
FIG. 5 is a diagram schematically showing an imprint device for conducting an imprint method in the third embodiment.
Figure 6:
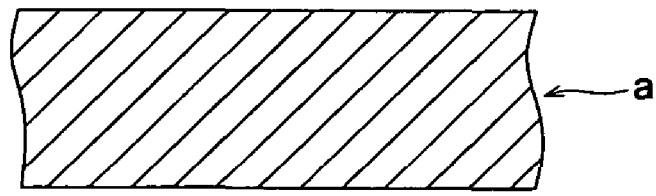
FIG. 6 is a sectional view of a base member representing an object to be formed in an imprint method of the third embodiment.
Figure 7:
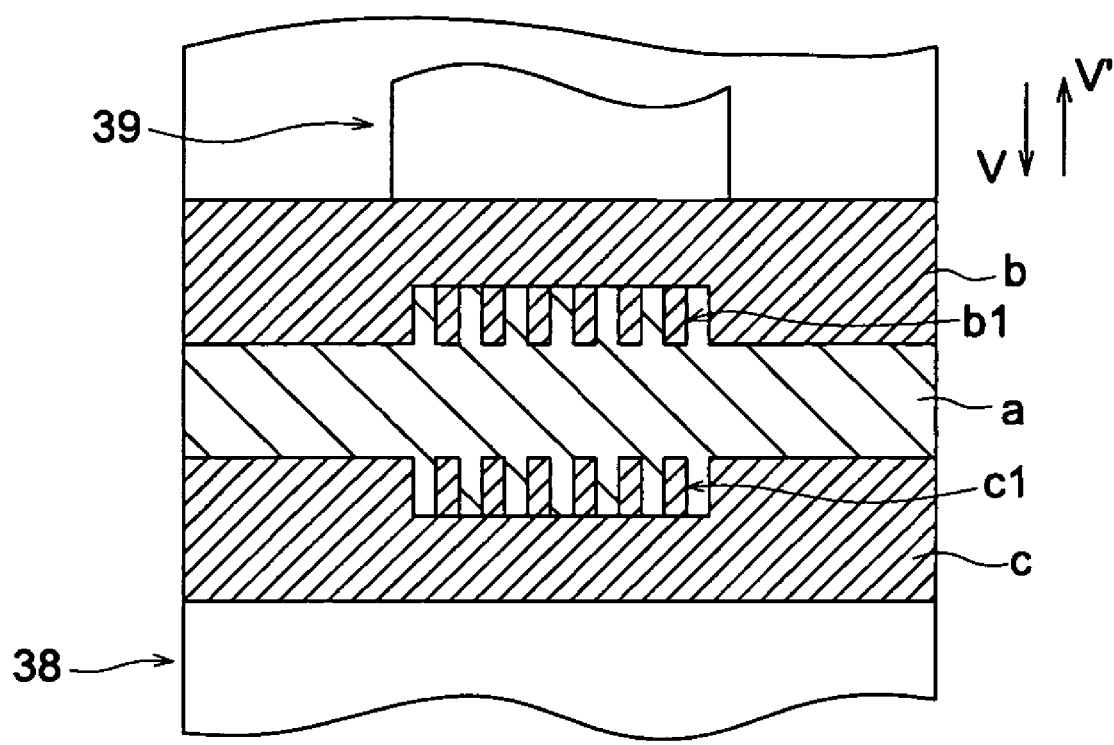
FIG. 7 is a side sectional view schematically showing primary parts of an imprint device for conducting imprint method by the third embodiment.
Figure 8:
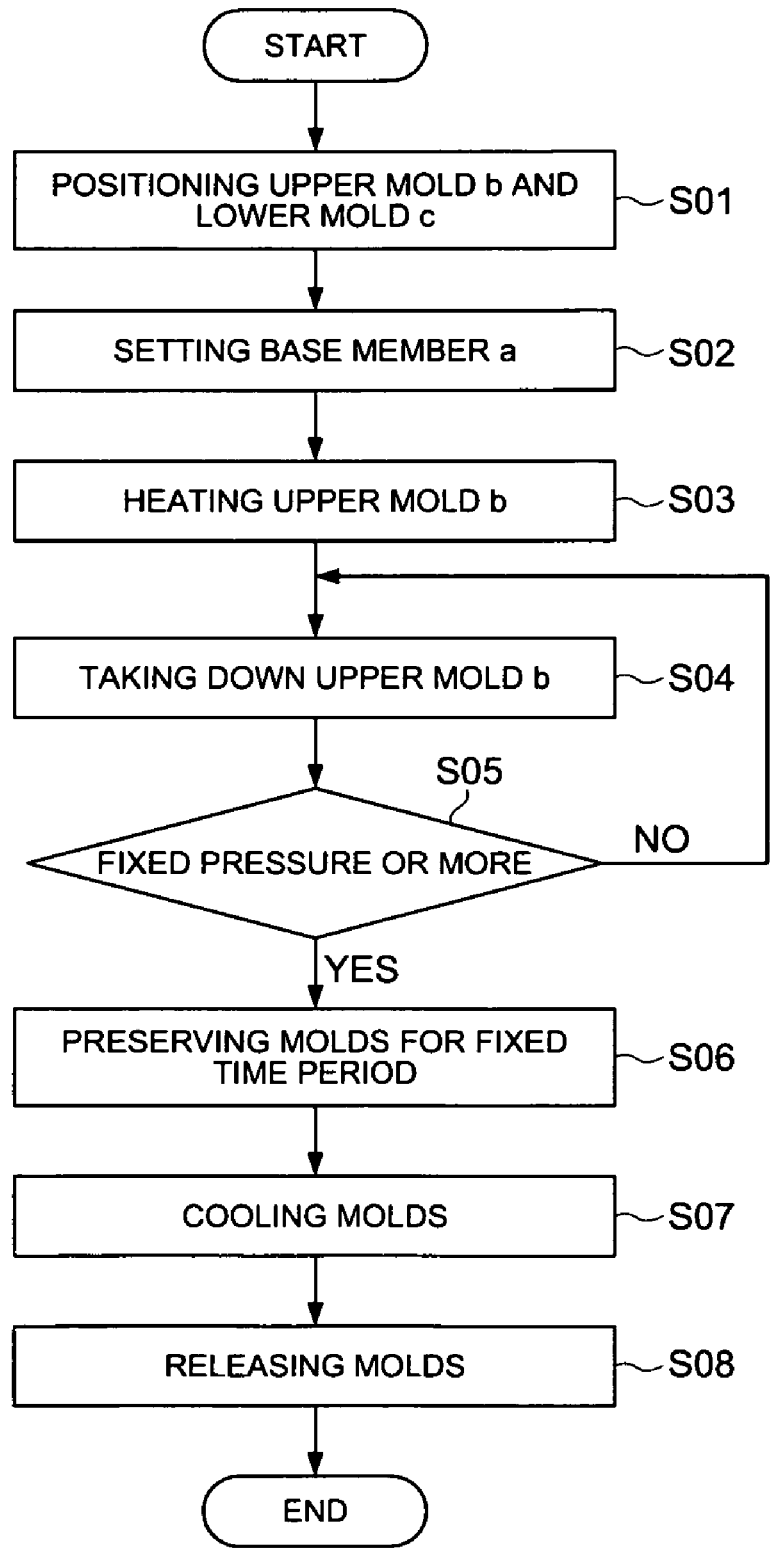
FIG. 8 is a flow chart for illustrating steps S01-S08 of a manufacturing method by imprint method in the third embodiment.

FIG. 5 is a diagram schematically showing an imprint device for conducting an imprint method in the third embodiment. FIG. 6 is a sectional view of a base member representing an object to be formed in an imprint method of the third embodiment. FIG. 7 is a side sectional view schematically showing primary parts of an imprint device for conducting imprint method by the third embodiment. FIG. 8 is a flow chart for illustrating steps S01-S08 of a manufacturing method by imprint method by the third embodiment.

As is shown in FIG. 5, imprint device 30 is equipped with frame 31 on which motor 36 is mounted to be fixed, heater 32 that is positioned above upper mold b and heats the upper mold b, horizontal member 35 on which the heater 32 and bracket 39 are attached, guide 33 by which the horizontal member 35 is fixed, and with base section 34 on which the guide 33 and bracket 38 are fixed.

The imprint device 30 is constituted in a way wherein the upper mold b is attached on the bracket 39, lower mold c is attached on the bracket 38 that is positioned on the upper side of the base section 34 so that the lower mold c may face the upper mold b. The imprint device 30 is constituted in a way wherein base member a representing an object to be formed is arranged between the lower mold c and the upper mold b, and after that, a rotation of motor 36 take vertically down the upper mold b in the direction v toward the lower mold c to press the base member.

Further, X-Y-θ stage is provided on the bracket 39 for the upper mold b, and whereby, it is possible to conduct adjustment of relative planar positions between the upper mold b attached on the bracket 39 and the lower mold c attached on the bracket 38.

Further, on the base section 34, there is provided installation hole 37 through which a camera section of a monitor device and an irradiation nozzle section of a UV irradiation device can be installed. Bracket 38 on which the lower mold c is attached is made of light-transmitting material such as glass, to be capable of transmitting light. Accordingly, the lower mold c and the upper mold b can be observed through bracket 38 by a camera section of the monitor device attached to the installation hole 37, and further, a ultraviolet ray can be emitted toward the lower mold c from an irradiation nozzle section of a ultraviolet irradiation device through bracket 38.

Base member a is a sheet-like thermoplastic resin as shown in FIG. 6. Optical resin materials such as polyolefin resin and norbornene-based resin are preferable as this resin, and APEL made by Mitsui Chemicals, Inc., ARTON made by JSR Corporation and ZEONOR as well as ZEONEX made by ZEON Corporation can be used specifically.

As shown in FIG. 7, the upper mold b has convex-concave section b1 corresponding to fine-periodic structure 15 of the first area 11 and fine-periodic structure 16 of the second area 12 in FIGS. 1(*a*)-1(*c*), and the lower mold c has convex-concave section c1 corresponding to fine-periodic structure 17 and fine-periodic structure 18. The upper mold b has, on convex-concave section b1, a linear boundary corresponding to boundary section 13 of two areas 11 and 12 on surface 10*a* on one side of FIGS. 1(*a*) and 1(*b*). The lower mold c has, on convex-concave section c1, a linear boundary corresponding to boundary section 19 of two areas 11 and 12 on surface 10*b* on the other side of FIG. 1(*b*) in the same way.

Next, processes S01-S08 of imprint method that manufactures optical element 10 in FIGS. 1(*a*)-1(*c*) will be explained as follows, referring to FIG. 8.

First, upper mold b and lower mold c shown in FIG. 7 are prepared, then, the upper mold b and lower mold c are attached respectively on bracket 39 and bracket 38. After that, positioning between the upper mold b and the lower mold c is carried out (S01).

Namely, the aforesaid positioning is to adjust positions so that a linear boundary of upper mold b corresponding to boundary section 13 (see FIGS. 1(*a*) and 1(*b*)) of two areas 11 and 12 may overlap with a linear boundary of lower mold c corresponding to boundary section 19 (see FIG. 1(*b*)) of two areas 11 and 12, which can be carried out highly accurately. This position adjustment can be conducted by attaching the camera section of the monitor device to the installation hole 37, and by adjusting finely the upper mold b on a plane with X-Y-θ stage provided on bracket 39 of the upper mold b, while observing the convex-concave section of the lower mold c and the convex-concave section of the upper mold b through bracket 38 that can transmit light.

In the meantime, positioning between the upper mold b and the lower mold c can be carried out more accurately by preliminary forming the object through the following process and by measuring positions of boundary sections 13 and 19 of the formed object thus obtained for fine adjustment. Further, it is possible to omit the process of observation by the monitor device stated above, because positioning between the upper mold b and the lower mold c can be conducted highly accurately by repeating the preliminary forming and thereby by repeating fine adjustment.

Next, base member a in FIG. 6 is set between the upper mold b and the lower mold c (S02). Then, after heating the upper mold b up to the prescribed temperature (S03), motor 36 is rotated to take vertically down the upper mold b in the direction of arrow v (S04), and the base member is pressed between the upper mold b and the lower mold c until the moment when pressure is raised to the prescribed level or higher (S05), and the upper mold b and the lower mold c are kept for the prescribed time under the condition of this pressure (S06).

Next, after cooling the upper mold b and the lower mold c (S07), the upper mold b is taken vertically up in the direction of arrow v', and then, base member a is removed from the lower mold c for mold release (S08), thus, optical element 10 is obtained.

Incidentally, the upper mold b and the lower mold c can be made, for example, by forming resist mask by coating resist evenly on a mold base member made of glass, then, by drawing prescribed microscopic patterns with an electron beam, then, by developing the patterns with prescribed developing materials, and by conducting dry etching such as plasma etching for the mold base member on which the microscopic patterns are formed to form convex-concave sections b1 and c1. This drawing with an electron beam can be done by an electron beam drawing device proposed by the inventors of the present invention in JP-A Nos. 2004-107793 and 2004-54218. Owing to this, desired drawn patters can be formed on a resist film at high accuracy in submicroscopic order through three-dimensional image drawing by an electron beam.

In the aforesaid manner, it allows a simple manufacture, through an imprint method, of the optical element 10 comprising opposing surfaces 10*a*, 10*b* each comprising two areas 11, 12 each including a fine-periodic structure, wherein the fine-periodic structures of the two areas have different directions from each other in each of the opposing surfaces. Further, with respect to the upper mold b and the lower mold c, linear boundaries corresponding to boundary sections 13 and 19 each of areas 11 and 12 are positioned in highly accuracy, and fine-periodic structures are formed simultaneously on surface 10a and surface 10b by using the upper mold b and the lower mold c which are aligned accurately in advance. Thereby, it is possible to obtain optical element 10 that does not need adjustment of positions and a space for boundary sections 13 and 19 of two areas on opposing surfaces.

Fourth Embodiment

Next, another method of manufacturing optical element 10 through an imprint method shown in FIGS. 1(a) to 1(c) will be explained as the fourth embodiment as follows, referring to FIG. 9 and FIG. 10.

Figure 9:
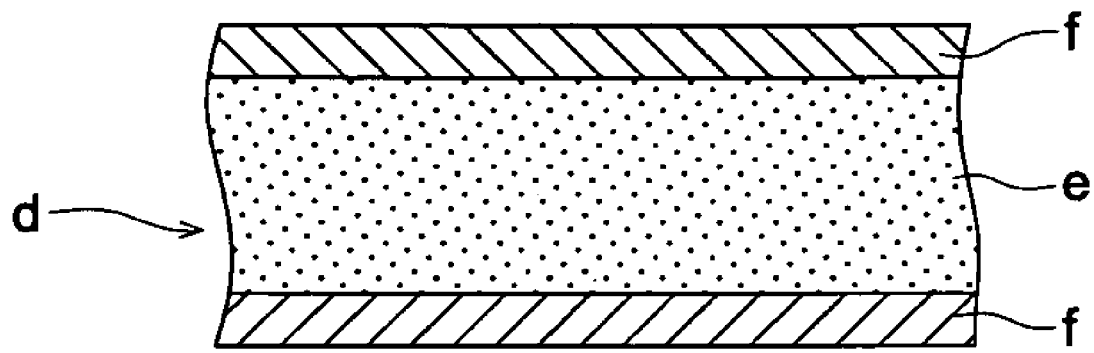
FIG. 9 is a sectional view of a base member representing an object to be formed through an imprint method of the fourth embodiment.
Figure 10:
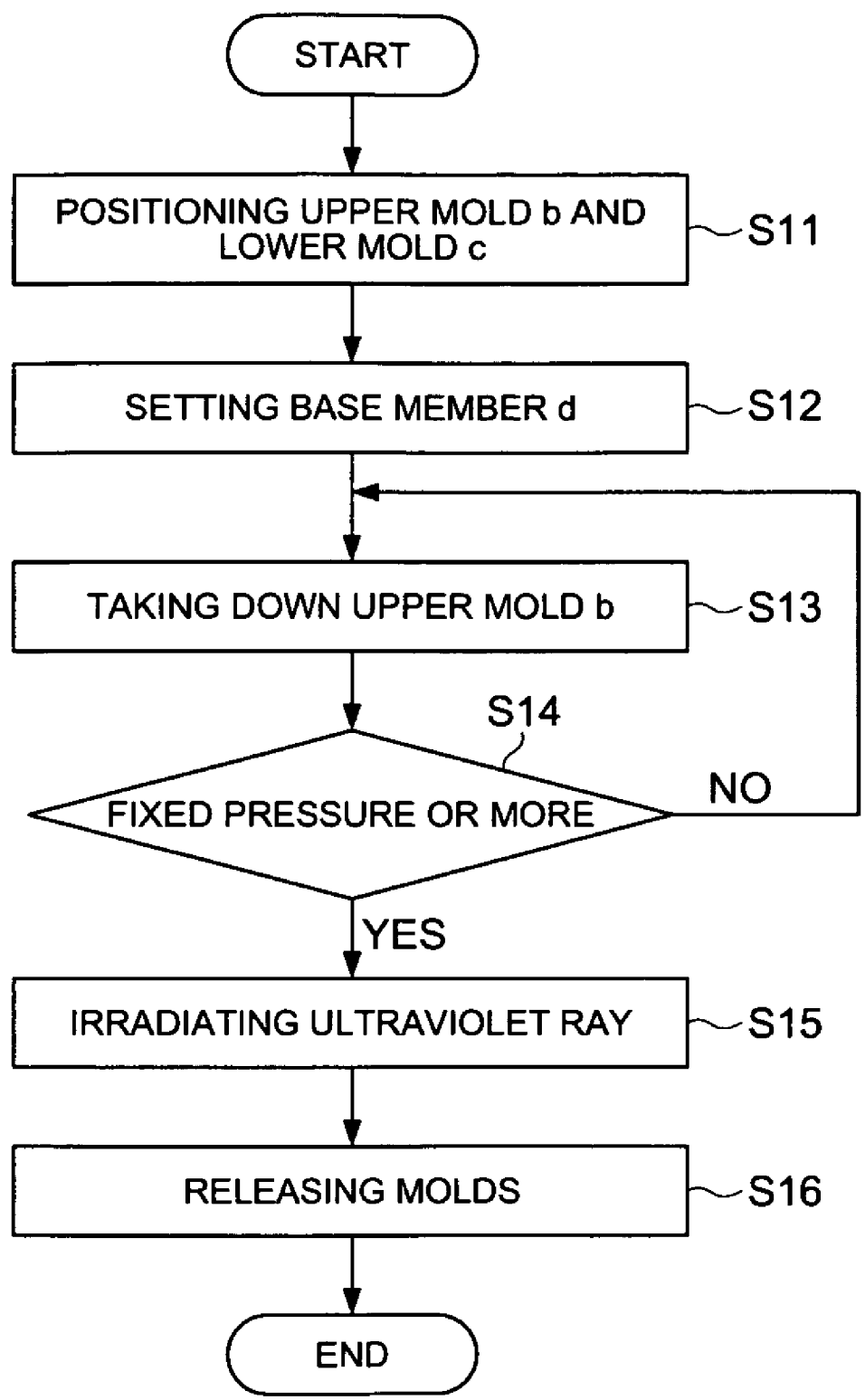
FIG. 10 is a flow chart for illustrating steps S11-S16 of a manufacturing method by an imprint method in the fourth embodiment.

FIG. 9 is a sectional view of a base member representing an object to be formed through an imprint method of the fourth embodiment. FIG. 10 is a flow chart for illustrating steps S11-S16 of a manufacturing method by an imprint method in the fourth embodiment.

The manufacturing method for optical element 10 relating to the fourth embodiment can be carried out by an imprint device shown in FIG. 5 by the use of base member d like that shown in FIG. 9. The base member d has ultraviolet curing resin layer f formed on each of opposing surfaces of glass plate e as shown in FIG. 9.

Steps S11-S16 of an imprint method that manufactures optical element 10 shown in FIGS. 1(a) to 1(c) will be illustrated as follows, referring to FIG. 10.

First, upper mold b and lower mold c which are the same as those shown in FIG. 7 are prepared, then, the upper mold b and the lower mold c are attached respectively on bracket 39 and bracket 38 of imprint device 30 shown in FIG. 5. After that, positioning between the upper mold b and the lower mold c is conducted in the same way as in the third embodiment (S11).

Next, base member d shown in FIG. 9 is set between the upper mold b and the lower mold c (S12). Then, motor 36 is rotated to take vertically down the upper mold b in the direction v (S13) so that the base member d may be pressed between the upper mold b and the lower mold c until the moment when the pressure arrives at the prescribed level or higher (S14). Under the condition of this pressure, ultraviolet rays is emitted to base member d located between the lower mold c and the upper mold b for the prescribed period of time, through bracket 38, from an irradiation nozzle section of an ultraviolet irradiation equipment attached to mounting hole 37 (S15).

Next, the upper mold b is taken vertically up in the direction of arrow v', and the base member d is removed from the lower mold c to be separated therefrom and for mold release (S16), thus, optical element 10 can be obtained.

In the aforesaid way, it allows a simple manufacture, through an imprint method, of the optical element 10 comprising opposing surfaces 10a, 10b each comprising two areas 11, 12 each including a fine-periodic structure, wherein the fine-periodic structures of the two areas have different directions from each other in each of the opposing surfaces. As stated above, a fine-periodic structure is transferred from the upper mold b and the lower mold c onto a ultraviolet curing resin layer f formed on each of both surfaces of glass plate e of base member d in pressing process S14, and the ultraviolet curing resin layers f on both sides are cured in UV irradiation process S15. As stated above, fine-periodic structures are formed simultaneously on both surfaces 10a and 10b of the base member by using upper mold b and lower mold c which are aligned highly accurately in advance, in the same way as in FIG. 8. Thereby, it is possible to obtain optical element 10 that does not need adjustment of positions and a space for boundary sections 13 and 19 of two areas on opposing surfaces.

Fifth Embodiment

Next, another method of manufacturing optical element 10' through an imprint method shown in FIG. 3 and FIG. 14 will be explained as the fifth embodiment as follows, referring to FIG. 11, FIG. 12 and FIGS. 13(a) to 13(c).

Figure 11:
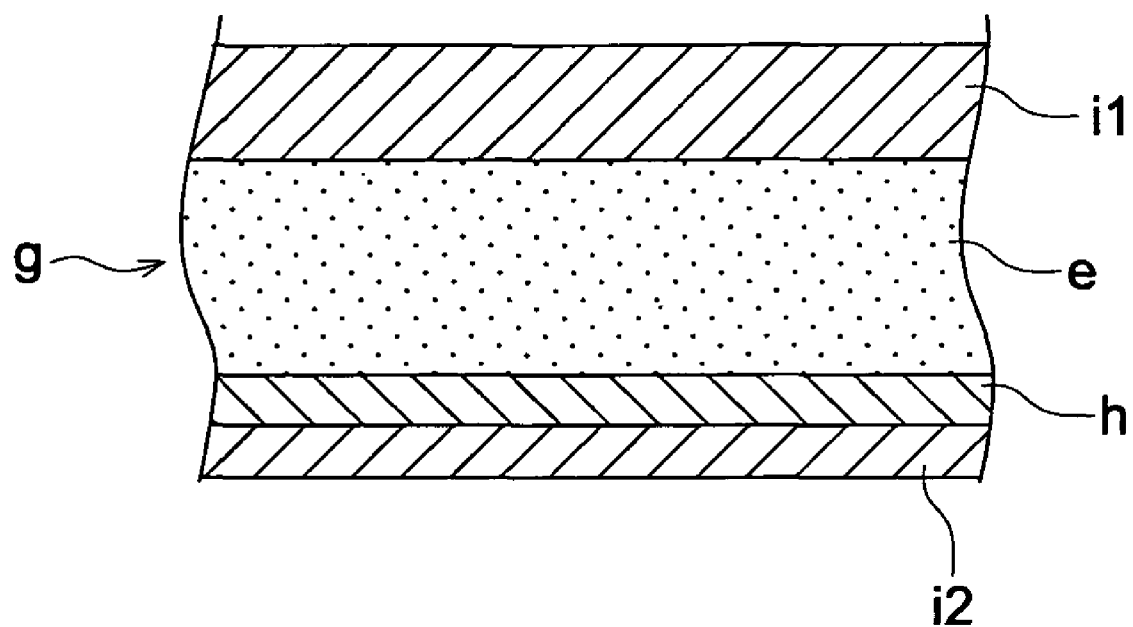
FIG. 11 is a sectional view of a base member representing an object to be formed in an imprint method of the fifth embodiment.

FIG. 11 is a sectional view of a base member representing an object to be formed in an imprint method of the fifth embodiment. FIG. 12 is a flow chart for illustrating steps S21-S29 of a manufacturing method by an imprint method in the fifth embodiment. Each of FIGS. 13(a) to 13(c) is a schematic diagram showing the state of a section of an object to be formed in the process shown in FIG. 12.

The manufacturing method for optical element 10' in the fifth embodiment can be carried out by the imprint device shown in FIG. 5 by using base member g like that shown in FIG. 11. As shown in FIG. 11, the base member g has thermoplastic resin layer i1 on a surface on one side of glass plate, then, has metal layer h on the surface on the other side of the glass plate e. The base member g further has thermoplastic resin layer i2 on the metal layer h.

In the optical element 10', thermoplastic resin layer i1 which is formed on base member 10a on one side is formed on each of latticed fine-periodic structures 15 and 16 in the following way to function as a structural birefringence wave plate, and metal layer h formed on surface 10b on the other side is formed on each of latticed fine-periodic structures 17 and 18 in the following way to function as a polarization separating element.

Steps S21-S29 of imprint method for manufacturing optical element 10' will be explained by referring to FIG. 12 and FIGS. 13(a) to 13(c).

First, upper mold b and lower mold c which are the same as those in FIG. 7 are prepared. After attaching them respectively on brackets 39 and 38 of imprint device 30 in FIG. 5, positioning between the upper mold b and the lower mold c is conducted in the same way as in the second embodiment (S21). In the meantime, convex-concave sections b1 of the upper mold b are in forms corresponding to latticed fine-periodic structures 15 and 16 on surface 10a on one side of optical element 10', while, convex-concave sections c1 of the lower mold c are in forms corresponding to latticed fine-periodic structures 17 and 18 on surface 10b on the other side of optical element 10'.

Next, base member g shown in FIG. 11 is set between the upper mold b and the lower mold c (S22). Then, motor 36 is rotated, after heating the upper mold b up to the prescribed temperature (S23), to take vertically down the upper mold b in the direction arrow v (S24) by rotating motor 36 so that the base member g may be pressed between the upper mold b and the lower mold c until the moment when the pressure arrives at the prescribed level or higher (S25). Then, the upper mold b and the lower mold c are preserved under the condition of this pressure (S26).

Next, after cooling the upper mold b and the lower mold c (S27), the upper mold b is taken vertically up in the direction of arrow v', and then, base member g is removed from the lower mold c to be separated for the mold release (S28). In this case, a cross section of base member g is in a form shown in FIG. 13(a). Namely, the metal layer h remains unchanged, and thermoplastic resin layer i1 and thermoplastic resin layer i2 turn out to be in the state wherein a shape of the upper mold b is transferred onto the thermoplastic resin layer i1 and a shape of the lower mold c is transferred onto the thermoplastic resin layer i2.

Next, metal layer h positioned between thermoplastic resin layer i2 and glass plate e is processed to be in a shape of a lattice, for example, by etching thermoplastic resin layer i2 on a surface on the other side of base member g released from the mold (serving as a mask for etching onto which a fine-periodic structure has been transferred from the lower mold c) (S29). The cross section after etching is in a shape like that shown in FIG. 13(b). Namely, it is in the state in which an exposed portion in the metal layer h is eluted to disappear.

Then, when residual thermoplastic resin layer i2 is removed, a status turns out to be in the condition where a latticed fine-periodic structure corresponding to the fine-periodic structure transferred onto the thermoplastic resin layer i2 is formed on metal layer h as shown in FIG. 13(c).

In the optical element 10' obtained in the aforesaid way, the fine-periodic structure section formed on the thermoplastic resin layer i1 on surface 10a on one side functions as a structural birefringence wave plate, and the fine-periodic structure section formed on the metal layer h on surface 10b on the other side functions as the first polarization separating element and the second polarization separating element shown in FIG. 3. With respect to the dimensions of the illustrated respective portions, for example, convex-concave periodic pitch p of a fine-periodic structure on surface 10a on one side is made to be about 300 nm, width w of each convex portion is made to be about 200 nm and convex-concave depth H is made to be about 1000 nm. Due to the dimensions, the fine-periodic structures on surface 10a on one side works as −quarter wave plate and +quarter wave plate. While, fine-periodic structure sections on surface 10b on the other side is made of a metallic material such as aluminum, and periodic pitch p is made to be about 150 nm, width w of each convex portion is made to be about 100 nm, and convex-concave depth H is made to be about 150 nm. Due to the dimensions, the fine-periodic structure sections on surface 10b on the other side is formed so as to work as a polarization separating element. Incidentally, the aforesaid dimensions represent an example, and other dimensions are also acceptable naturally.

In the aforesaid manner, it is possible to provide two areas 11 and 12 which are different from each other in terms of a direction of a fine-periodic structure on the same surface, and to manufacture optical element 10' having the fine-periodic structures on its both sides through an imprint method simply. In this case, the fine-periodic structure is transferred from the upper mold b onto thermoplastic resin layer i1 on surface 10a on one side of base member g in FIG. 11, and a latticed fine-periodic structure is formed on metal layer h on surface 10b on the other side. Whereby, it is possible to obtain optical element 10' requiring no adjustment of positions and spaces of boundary sections 13 and 19 each of two areas between opposing surfaces 10a and 10b, because fine-periodic structures can be formed on opposing surfaces of the base member by the use of upper mold b and lower mold c which are aligned accurately in advance.

Incidentally, though the preferred embodiments of the invention have been explained, the invention is not limited to these embodiments, and the embodiments can be varied by those skilled in the art without departing from the spirit and scope of the invention. For example, in the optical system for an optical pickup in FIG. 4, an optical system in FIG. 2 may be arranged, and the same effects as those in the occasion in FIG. 3 can be obtained.

Further, the base member g in FIG. 11 can have a ultraviolet curing resin layer on one surface of glass plate e and has metal layer h on the other surface, and further have a ultraviolet curing resin layer on metal layer h. A ultraviolet ray can be emitted on base member g between the lower mold c and the upper mold b, under the state of pressure where the base member g positioned between the lower mold c and the upper mold g is pressed for the prescribed period of time until the moment when the pressure arrives at a fixed level or higher, in the same way as in FIG. 10. Thus, etching is carried out using a ultraviolet curing resin layer on metal layer h that is cured by the foregoing as a mask for etching, and even when etching metal layer h to be in a latticed form, same optical element 10' can be obtained.

The invention claimed is:

1. An optical element comprising:
   opposing surfaces each comprising two areas each including a fine-periodic structure, the fine-periodic structures of the two areas having different directions from each other in each of the opposing surfaces,
   wherein one of the opposing surfaces with the fine-periodic structures works as a quarter-wave plate and the other of the opposing surfaces with the fine-periodic structures works as a polarization separating element, and
   a boundary of the two areas in one of the opposing surfaces and a boundary of the two areas in the other of the opposing surfaces are positionally identical.

2. The optical element of claim 1,
   wherein, in the two areas formed on the one of the opposing surfaces working as a quarter-wave plate, the fine-periodic structure in one of the two areas works as a −quarter-wave plate and
   the fine-periodic structure in the other of the two areas works as a +quarter-wave plate.

3. An optical pickup device comprising:
   a light source for emitting a light flux with a predetermined wavelength;
   an objective lens for converging the light flux into a light spot on a recording surface of a recording medium;
   a light-receiving element for receiving a reflected light flux from the recoding surface of the recording medium;
   a beam splitter arranged to guide the light flux from the light source to the objective lens and to guide the reflected light flux from the recording surface of the recording medium to the light-receiving element; and
   an optical element of claim 1, arranged between the beam splitter and the light-receiving element, wherein a surface of the optical element working as the polarizing splitting element faces the light-receiving element.

* * * * *